United States Patent [19]

Fuchs et al.

[11] 4,113,719
[45] Sep. 12, 1978

[54] 1:2-COBALT-COMPLEX AZO DYESTUFFS HAVING AN ACETOACETYLAMINO DIPHENYLAMINO COUPLER

[75] Inventors: Hermann Fuchs, Kelkheim, Taunus; Klaus Filzinger, Hofheim, Taunus, both of Fed. Rep. of Germany

[73] Assignee: Hoechst Aktiengesellschaft, Frankfurt am Main, Fed. Rep. of Germany

[21] Appl. No.: 765,004

[22] Filed: Feb. 2, 1977

[30] Foreign Application Priority Data

Apr. 14, 1976 [DE] Fed. Rep. of Germany ....... 2616405

[51] Int. Cl.² .............................................. C09B 45/20
[52] U.S. Cl. ...................................... 260/149; 260/193
[58] Field of Search ................................. 260/149, 193

[56] References Cited

U.S. PATENT DOCUMENTS

1,844,398  2/1932  Kammerer et al. .................. 260/149

FOREIGN PATENT DOCUMENTS

876,486  3/1957  United Kingdom ..................... 260/149

*Primary Examiner*—Charles F. Warren
*Attorney, Agent, or Firm*—Curtis, Morris & Safford

[57] ABSTRACT

Novel, valuable 1:2-cobalt-complex dyestuffs of the monoazo compound of formula

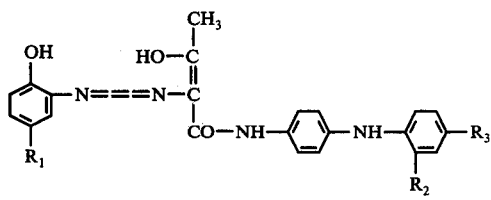

had been found, in which $R_1$ is halogen, nitro, lower alkyl, a sulfonamide radical or a carbonamide radical, and $R_2$ and $R_3$ are alternatively a nitro and sulfo group. These novel dyestuffs are well suitable for the dyeing of natural and synthetic polyamide fibers, especially in admixture with hydrophobic fibers, and also especially advantageously with other 1:2-chromium or 1:2-cobalt-complex dyestuffs containing one or two sulfonic acid groups per dyestuff molecule, yielding even, strong dyeings of high fastnesses to wet processing and to use as well as to light. — The novel cobalt complex dyestuffs can be prepared by cobalting the above monoazo compound (1) by means of a cobalt yielding agent.

1 Claim, No Drawings

1:2-COBALT-COMPLEX AZO DYESTUFFS HAVING AN ACETOACETYLAMINO DIPHENYLAMINO COUPLER

Novel 1:2-cobalt complexes of monoazo compounds of the general formula (1) have been found

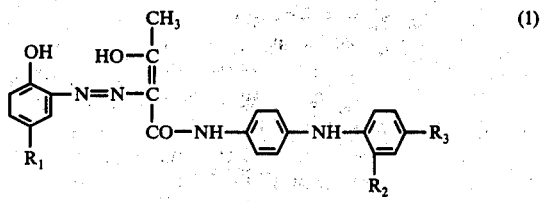

in which $R_1$ is halogen, such as chlorine or bromine, preferably chlorine, a nitro group, lower alkyl, such as methyl or ethyl, preferably methyl, or a sulfonamide or carbonamide group of the formula

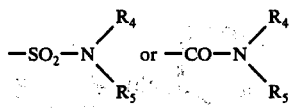

in which $R_4$ and $R_5$ are identical or different and each represent hydrogen or alkyl having 1 to 4 carbon atoms, and $R_5$ may also be a phenyl radical optionally substituted by 1, 2 or 3 substituents selected from the group lower alkyl, lower alkoxy and chlorine, and $R_2$ is different from $R_3$, each standing for a nitro or sulfo group.

The novel dyestuffs are preferably present in the form of their alkali metal salts or alkaline earth metal salts, such as sodium, potassium or calcium, or ammonium salts.

They are prepared according to the invention by a process which comprises coupling an aceto-acetyl-diphenylamine compound of the general formula (2)

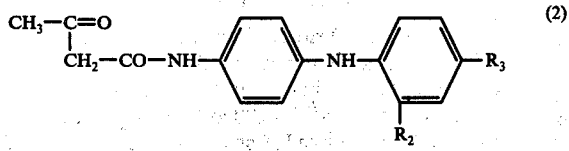

wherein $R_2$ and $R_3$ are defined as above, with a diazotized amine of the general formula (3)

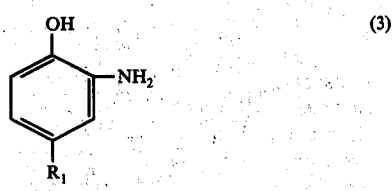

in which $R_1$ is defined as above, at a temperature of from $-10°$ to $+40°$ C and at a pH value of from 7 to 10, preferably from 7.5 to 9, to yield an azo dyestuff of the general formula (1), and metallizing this azo dyestuff with a cobalt complexing agent at a temperature of from 60° to 145° C, for example between 60° and 100° to 105° C under normal pressure, or between 105° and 145° C under pressure, and at a pH value of from 4.5 to 10, preferably between 5.5 and 8.5, to give the 1:2-cobalt complex dyestuff of the invention. The metallization is preferably carried out in an aqueous medium.

As cobalt complexing agents there may be mentioned cobalt salts of inorganic or organic acids, such as cobalt carbonate, cobalt hydroxycarbonate, cobalt acetate and cobalt sulfate. The cobalt complexing process may be carried out in the presence of an acid-binding agent, such as salts, oxides or hydroxides of alkali metals or alkaline earth metals or of a salt of these alkaline earth and alkali metals having an alkaline effect; such compounds are, for example, sodium or potassium acetate, sodium or potassium carbonate or hydrogeno-carbonate, sodium or potassium hydroxide, calcium carbonate or calcium oxide.

The cobalt complex dyestuffs thus obtained may be isolated from their preparation solutions by being salted out with sodium or potassium chloride or by way of spray-drying.

The novel dyestuffs may be used according to the invention for the dyeing of natural and synthetic polyamide fibers, for example wool, silk and polyamides of ε-caprolactam, of hexamethylene-diamine and adipic acid or of ω-amino-undecylic acid. They may be used in a particularly advantageous manner for the dyeing of the above-mentioned fibers in admixture with other hydrophobic types of fiber, for example for dyeing of wool in mixtures of wool and polyester fibers, with an excellent resist effect of the hydrophobic fiber portion.

The dyestuffs are used preferably in the form of their alkali metal salts, such as the sodium, potassium or ammonium salts. However, they may also be used for the dyeing in admixture with other 1:2-cobalt- or -chromium-complex dyestuffs which contain one or two sulfonic acid groups per dyestuff molecule. The dyeing processes are carried out according to methods which are known and common for metal complex dyestuffs. The dyeing is effected preferably from an acid to neutral bath, preferably in a pH range of from 4.0 to 6.5 and at a temperature of from 90° to 105° C; in this dyeing process the common dyeing auxiliary agents are used, for example fatty amine- or fatty alcohol-oxethylation products, as well as common buffer substances, such as sodium phosphate, sodium acetate, sodium formiate, optionally in admixture with the corresponding acids, in order to stabilize the pH value of the dye bath. For example, by the addition of an acid, such as formic acid or acetic acid or of a mineral acid to the dye bath which contains an alkali metal salt of the formic acid, acetic acid or of another organic acid, a pH value of the bath may be adjusted which accords with the optimum dyeing condition, in respect of the dyestuff concentration used and the desired colour depth on the fiber.

For the local dyeing by printing, printing pastes are used which contain the common thickeners and printing auxiliary agents as well as a salt of a weak base and a strong mineral acid or of an organic acid, for example ammonium sulfate or ammonium tartrate. The printed fabrics are dried and treated for a short time with hot air or steam.

In this manner the novel dyestuffs of the invention yield on natural and synthetic polyamide fibers orange to brownish-yellow colour shades having good to very good fastness properties with regard to wet processing, for example the fastness to washing at 20° to 60° C, for example at 40° and 60° C according to DIN 54010 and 54014, the fastness to water (under severe conditions), the fastness to aklaline and acid perspiration, to potting, to acid and alkaline fulling, to steam and hot water, to chlorinated water and to peroxide bleaching, to formaldehyde, to cross-dyeing and to the acid chlorination of wool, and good fastness properties with regard to solvents, to carbonizing and decatizing, as well as excellent fastness properties to light in the Xeno test and to daylight.

The dyestuffs of the following Examples 1 and 2 are preferred.

The starting compounds of the formula (2), 2-nitro-4'-N-acetoamino-diphenylamine-2-sulfonic acid or 4-nitro-4'-N-aceto-acetylamino-diphenylamine-2-sulfonic acid, are obtained by reacting a compound of the general formula (4)

cess nitrous acid. Subsequently the diazo suspension thus prepared is mixed with the above-described solution of the N-aceto-acetyl compound. The reaction mixture is adjusted to a pH value of 8.0 by means of anhydrous sodium carbonate. The coupling is completed after 6 hours at room temperature. Thereafter the pH value of the dyestuff suspension is adjusted at first to a pH of 7.0 by means of an aqueous 31% hydrochloric acid, and then to 6.0 by means of acetic acid; 6.35 parts of cobalt-hydroxide carbonate having a content of cobalt of 47% are added, and the mixture is refluxed for 4 hours. The 1:2-cobalt complex formed is precipitated by being salted out with sodium chloride or is isolated by spray-drying. The dyestuff corresponds in the form of the free acid to the formula

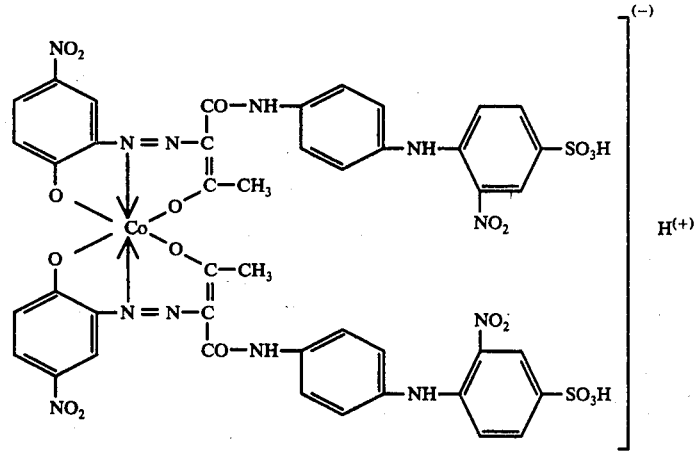

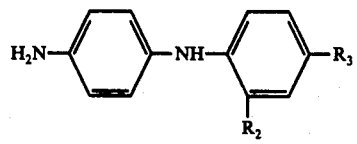

(4)

wherein $R_2$ and $R_3$ are defined as above, the diketene in an aqueous solution.

The following Examples serve to illustrate the invention. The parts are parts by weight, the percentages are percent by weight.

EXAMPLE 1

30.9 Parts of 2-nitro-4'-amino-diphenylamine-4-sulfonic acid are dissolved in 100 parts of water and 12.1 parts of an aqueous 33% sodium hydroxide solution. The mixture is heated to 55° C, and 10.1 parts of diketene are added dropwise within 30 minutes, afterwards the whole is continued to be stirred for 1 hour at 55° C. The solution of 2-nitro-4' -N-aceto-acetylaminodiphenyl-4-sulfonic acid thus obtained is used directly for the following coupling.

15.4 Parts of 4-nitro-2-aminophenol are dissolved with 25 parts of 31% hydrochloric acid in 150 parts of water; 50 parts of ice are added, and the aminophenol is diazotized by adding dropwise 17.3 parts of an aqueous 40% sodium nitrite solution. After 30 minutes, 0.5 part of amido-sulfonic acid is added in order to destroy ex-

DYEING EXAMPLE

100 Parts of wool fabric are introduced into an aqueous dye bath having a temperature of 40° C which consists of 1.0 part of the cobalt-complex dyestuff of Example 1, 0.15 part of an addition product of 12 moles of ethylene oxide to 1 mole of stearylamine, 2 parts of ammonium acetate and 2 parts of an aqueous 60% acetic acid in 3000 parts of water. The temperature of the dye bath is increased to boiling point within 30 minutes, and the dyeing is then continued for 60 minutes at 100° C. Subsequently the dyeing is after-treated and completed as usual. A yellow-brown dyeing is obtained which shows a good evenness, good to very good fastness properties with regard to wet processing and an excellent fastness to light.

If the wool fabric is replaced by 100 parts of polycaprolactam fabric, a dyeing is obtaining which also shows good to very good general fastness properties as well as an excellent fastness to light.

EXAMPLE 2

If in the preparation of the metal-free azo dyestuffs of Example 1 the 4-nitro-2-aminophenol is replaced by 14.4 parts of 4-chloro-2-aminophenol, and the reaction is carried out analogously to the method described in Example 1, a dyestuff is obtained which in the form of the free acid corresponds to the formula:

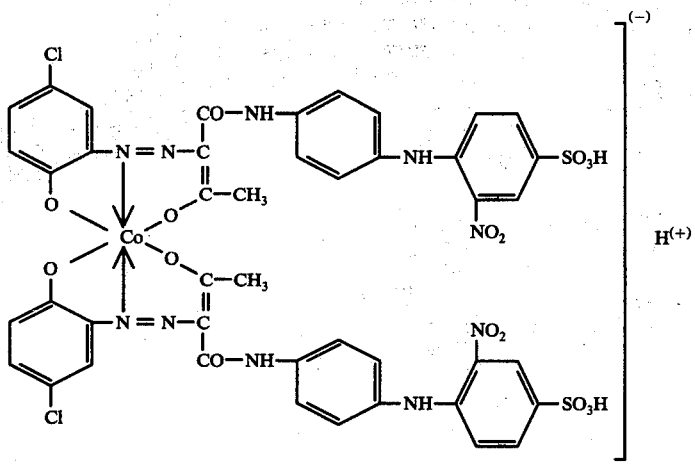

DYEING EXAMPLE

100 Parts of polycaprolactam fabric are introduced into a dye bath having a temperature of 40° C which consists of 1.5 parts of the cobalt-complex dyestuff of Example 2, 0.15 part of an addition product of 12 moles of ethylene oxide to 1 mole of stearylamine, 2 parts of ammonium acetate and 2 parts of an aqueous 60% acetic acid in 3000 parts of water. The temperature of the dye bath is increased within 15 minutes to 98°–100° C, and the dyeing is then continued for 60 minutes at 100° C. Subsequently the dyeing is after-treated and completed as usual. A brownish-orange dyeing is obtained which shows a good evenness, good to very good fastness properties with regard to wet processing as well as an excellent fastness to light.

It the polycaprolactam fabric is replaced by 100 parts of wool fabric, a dyeing is obtained which also shows good to very good general fastness properties as well as an excellent fastness to light.

EXAMPLE 3

30.9 Parts of 4-nitro-4'-N-aceto-acetylamino-diphenylamine-2-sulfonic acid are dissolved in 250 parts of water and 12.1 parts of an aqueous 33% sodium hydroxide solution. The mixture is heated to 60° C, and 10.1 parts of diketene are added dropwise within 30 minutes. The whole is continued to be stirred for another hour at 60° C. The solution of 4-nitro-4'-N-aceto-acetylamino-diphenylamine-2-sulfonic acid thus obtained is used directly for the coupling, as has been described in the following.

18.8 Parts of 2-aminophenol-4-sulfonic acid-amide are dissolved with 25 parts of an aqueous 31% hydrochloric acid in 150 parts of water. After the addition of 50 parts of ice, 17.3 parts of an aqueous 40% sodium nitrite solution are introduced into the mixture. Upon completion of the diazotization, 0.5 part of amidosulfonic acid is added, in order to destroy the excess nitrous acid. Subsequently the above-described solution of the aceto-acetyl compound is added; the mixture is then adjusted to a pH value of 8.0 with sodium carbonate. The coupling is completed at room temperature after 6 hours. The pH value of the dyestuff suspension is adjusted to 6.0 by means of hydrochloric acid, then 14.1 parts of crystallized cobalt sulfate and 13.5 parts of crystallized sodium acetate are added. The reaction mixture is then heated for 2 hours at a temperature in the range of from 130° to 140° C in a closed vessel. The 1:2-cobalt complex compound thus prepared is precipitated by being salted out with sodium chloride or is isolated by spray-drying; in the form of the free acid it corresponds to the formula

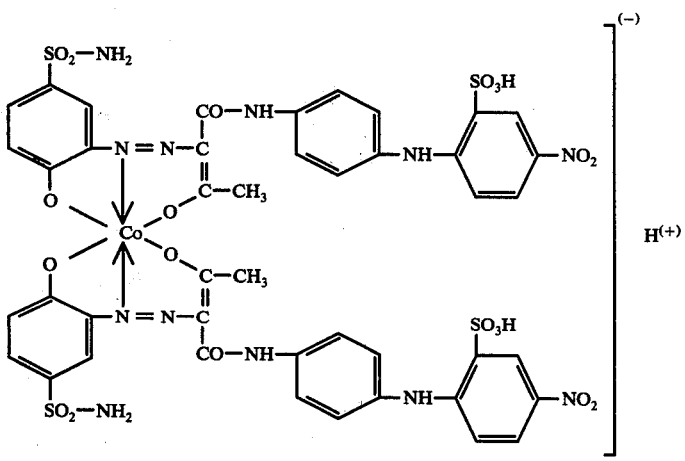

DYEING EXAMPLE

Polyamide carpet yarn is padded with a padding liquor containing 10 parts of the dyestuff of Example 3, 5 parts of a carob bean flour preparation, 4 parts of an addition product of 8 moles of ethylene oxide to 1 mole of isotridecyl alcohol and 10 parts of an aqueous 60% acetic acid in 1000 parts of the liquor, with a liquor pick-up of 100% by weight, thereafter steamed for 6 minutes at 100° to 102° C and rinsed with cold water. The orange dyeing obtained shows very good general fastness properties as well as excellent properties with regard to the fastness to daylight.

EXAMPLE 4

If in Example 3 the 2-aminophenol-4-sulfonic acid-amide is replaced by 12.3 parts of 2-amino-4-methylphenol, and the reaction is effected under the same conditions as indicated above, a dyestuff is obtained which in the form of the free acid corresponds to the following formula:

part of an addition product of 12 moles of ethylene oxide to 1 mole of stearylamine, 2 parts of ammonium acetate and 2 parts of an aqueous 60% acetic acid in 3000 parts of water. The temperature of the dye bath is increased within 30 minutes to the boiling point, and the dyeing is then continued for 60 minutes at 100° C. The dyeing obtained is after-treated and completed as usual in the art. An even brownish-yellow dyeing is obtained which shows good to very good properties with regard to the fastness to wet processing as well as an excellent fastness to light.

If the 100 parts of wool flock are replaced by the same amount of wool hank yarn, a very good even dyeing is also obtained which shows good to very good fastness properties with regard to wet processing and an excellent fastness to light.

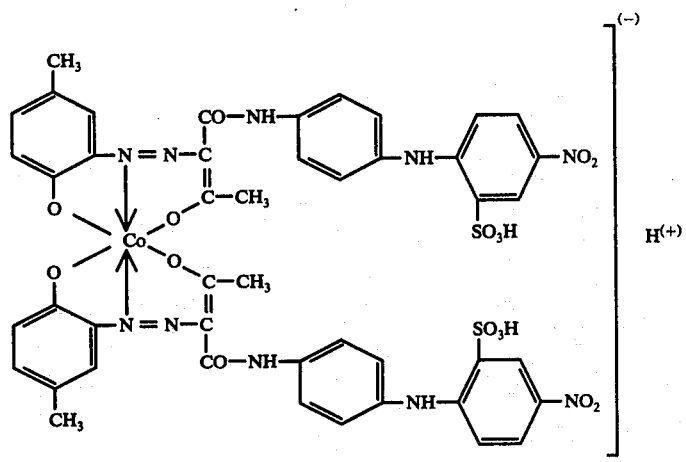

DYEING EXAMPLE

100 Parts of wool flock are introduced into a dye bath having a temperature of 40° C, which consists of 1.0 part of the cobalt-complex dyestuff of Example 4, 0.15

The following Table contains further 1:2-cobalt-complex dyestuffs of the invention which may be, and have been, prepared in a manner analogous to that of the above Examples.

| Ex. No. | 1:2-Cobalt complex of the compound | Color shade of the wool dyeing |
|---|---|---|
| 5) | (structure) | yellow-brown |
| 6) | (structure) | yellow-brown |
| 7) | (structure) | yellow-brown |

-continued

| Ex. No. | 1:2-Cobalt complex of the compound | Color shade of the wool dyeing |
|---|---|---|
| 8) | (structure with OH, N=N, CH₃, HO-C, CO-NH-phenyl-NH-phenyl with NO₂ and SO₃H; substituent CO-N(CH₃)₂) | yellow-brown |
| 9) | (structure with OH, Cl, N=N, CH₃, HO-C, CO-NH-phenyl-NH-phenyl with SO₃H and NO₂) | yellow-brown |
| 10) | (structure with OH, NO₂, N=N, CH₃, HO-C, CO-NH-phenyl-NH-phenyl with SO₃H and NO₂) | yellow-brown |
| 11) | (structure with OH, SO₂N(C₂H₅)₂, N=N, CH₃, HO-C, CO-NH-phenyl-NH-phenyl with NO₂ and SO₃H) | yellow-brown |
| 12) | (structure with OH, SO₂NH-(CH₂)₂-CH₃, N=N, CH₃, HO-C, CO-NH-phenyl-NH-phenyl with SO₃H and NO₂) | yellow-brown |

We claim:

1. A 1:2-cobalt complex compound of a monoazo compound of the formula

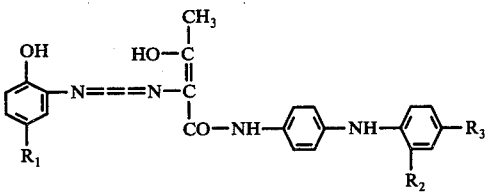

in which R₁ is halogen, nitro, lower alkyl, a sulfonamido group of the formula —SO₂—NR₄R₅ or a carbonamido group of the formula —CO—NR₄R₅, wherein R₄ and R₅ are identical or different and each is hydrogen or alkyl having 1 to 4 carbon atoms, or R₅ is phenyl unsubstituted or substituted by 1, 2 or 3 substitutents selected from the group lower alkly, lower alkoxy and chlorine, and R₂ is different from R₃ and each is nitro or sulfo.

* * * * *